United States Patent [19]
Appleby et al.

[11] Patent Number: 6,036,753
[45] Date of Patent: Mar. 14, 2000

[54] USE OF GLASS FIBER MATERIALS IN DIAGNOSING AND PREVENTING RADON INFILTRATION INTO BUILDINGS

[75] Inventors: Alan Appleby, Middlesex; George H. Sigel, Jr., Stockton; Il Sik Kim, Holmdel, all of N.J.

[73] Assignee: Rutgers, The State University of New Jersey, Brunswick, N.J.

[21] Appl. No.: 09/136,504

[22] Filed: Aug. 19, 1998

Related U.S. Application Data

[60] Provisional application No. 60/056,160, Aug. 19, 1997.

[51] Int. Cl.[7] .................................................. B01D 53/04
[52] U.S. Cl. ............................ 96/108; 52/169.1; 55/527; 95/127; 96/153
[58] Field of Search ............................. 95/273, 127, 116; 96/153, 154, 108; 55/527; 52/169.1

[56] References Cited

U.S. PATENT DOCUMENTS

| | | | |
|---|---|---|---|
| 3,614,421 | 10/1971 | Alter et al. | 96/413 |
| 3,853,501 | 12/1974 | Stringer | 95/214 |
| 4,426,214 | 1/1984 | Vandrish | 96/413 |
| 4,869,832 | 9/1989 | Lamarre | 95/260 |
| 5,106,759 | 4/1992 | Addison | 95/127 |
| 5,137,764 | 8/1992 | Doyle et al. | 428/44 |
| 5,149,343 | 9/1992 | Sowinski | 95/273 |
| 5,174,800 | 12/1992 | Schwilling et al. | 96/154 |
| 5,194,158 | 3/1993 | Matson | 95/263 |
| 5,277,703 | 1/1994 | Sklenak et al. | 95/77 |
| 5,352,274 | 10/1994 | Blakley | 95/285 |
| 5,743,944 | 4/1998 | Gross et al. | 95/230 |

*Primary Examiner*—Duane S. Smith
*Attorney, Agent, or Firm*—Salzman & Levy

[57] ABSTRACT

A method and apparatus for testing and remediating the effects of radon infiltration in buildings. The method of this invention places fiber glass materials over radon-emitting surfaces in order to entrap radon and radon progeny. The fiber glass materials can be formed into mats having a packed geometry. Each mat has fiber bundles having several thousand individual fibers. Each fiber has an approximate diameter size of about 50 microns. The glass fiber consists of a silicon oxide glass that may be doped, for example, with trivalent cerium ions. The mats can be of any geometrical configuration, such as rectangular.

21 Claims, 4 Drawing Sheets

USE OF GLASS FIBER MATERIALS IN DIAGNOSING AND PREVENTING RADON INFILTRATION INTO BUILDINGS

This application claims the benefit of U.S. Provisional Application No. 60/056,160 filed Aug. 19, 1997.

FIELD OF THE INVENTION

The invention pertains to radon detection and prevention techniques and, more particularly, to a method of using glass fiber materials for filtering radon and radon progeny, and preventing their infiltration into buildings.

BACKGROUND OF THE INVENTION

Radon contamination in existing buildings is a wide spread problem in many areas of the country. Most prominently, there exists an interstate ridge of uranium material that was deposited over the tri-state area of Connecticut, New Jersey and Pennsylvania during the last ice age. As the uranium decays, it emits radon, a colorless and odorless radioactive gas that easily infiltrates buildings and other dwelling structures. The radioactive radon in turn decays, giving rise to harmful progeny that, when inhaled, can lead to lung cancer and other congestive maladies.

Many buildings in the tri-state area were built upon the existing uranium ridge before cognizance of the problem. As a result, these contaminated buildings presently require radon testing and remediation.

Current technology for preventing radon infiltration into homes and other occupied buildings falls into two categories:

(1) active devices which employ continuously running fans to maintain a reduced air pressure beneath the building, thus preventing the radon from seeping into the building through foundational elements; and (2) passive systems involving radon-resistant construction that provides a barrier between the home and the source of radon (i.e, the ground beneath the building).

Present radon-resistant construction employs a plastic membrane installed over the concrete slab on which the house is constructed. However, it is general practice to punch holes in the plastic to allow access of air to the concrete as it cures, compromising the integrity of the sheet as a radon barrier. Even a tiny hole will allow radon atoms to pass and contaminate a dwelling.

Even if the integrity of the plastic membrane barrier were maintained, however, this method addresses only present, on-going construction. Generally, the plastic barrier cannot be retrofitted into existing radon-infiltrated buildings. Therefore, exhausting radon gases by continuously running fans is generally the only remediation choice currently available to property owners. This method has many disadvantages, such as: a) the cost of the exhaust fan remediation system is high; b) the exhaust fan remediation system has a limited operative life and must be refurbished periodically; and c) the remediation is not always completely successful due to improper workmanship, installation and materials.

The present invention reflects the discovery that glass fiber mats can replace the plastic barrier sheet. Glass fiber mats can be employed to effectively filter out the natural radioactive gas and its radioactive progeny from soil gases entering a building. Such mats are inherently porous, but current testing has shown that glass fibers in a close-packed geometry are capable of substantially retarding the passage of radon through them, while still allowing air to penetrate freely. Radon has a radioactive halflife of 3.8 days, so that with a sufficient degree of radon retardation, such mats would provide an effective barrier to entry of radioactive radon into a building. It is both possible and desirable to retro-fit existing structures with these mats, thus reducing the costs of present remediation techniques.

Radon gas atoms that are retained in these glass fiber mats will decay in time to other radioactive decay products (RDPs). These progeny comprise electrically charged metal atoms and would be efficiently entrapped by adsorption into the glass fibers.

In addition, the glass fiber mats can be analyzed retroactively for the presence of radon decay products to determine the prior levels of radon entering the building.

There is a present need in the epidemiological study of radon as a health hazard to establish prior levels of radon in the air of dwellings. Current art involves the placement of dosimetric devices for a period of a few weeks to a few months, and their subsequent retrieval and analysis. It is conventionally assumed that such measurements represent the prior radon levels.

Glass fiber mats that are in place in typical housing construction as insulation, as well as newly-installed, radon prevention mats, could be analyzed by existing techniques for the presence of long-lived RDPs of radon, especially lead-210, which has a halflife of about 21 years. The level of such RDPs that are found in the existing insulation of a dwelling, or in the prevention mats, could be used as a measure of the total integrated radon level to which such a dwelling had been subjected.

SUMMARY OF THE INVENTION

In accordance with the present invention, there are provided a method and apparatus for testing and remediating the effects of radon infiltration into buildings. The method of this invention places fiber glass materials over radon emitting surfaces in order to entrap radon and radon progeny. The fiber glass materials can be formed into mats, having a packed geometry. The mats can be manufactured in any suitable configuration or overall shape. To reduce the mean residence time to the mean radioactive lifetime of radon, which is 1.44 halflives, or 5.5 days, the mats need be no thicker than 15.8 cm, comparable to the present thickness of commercial insulating glass fiber mats.

It is an object of this invention to provide a low cost method and apparatus for radon testing and remediation in existing and new dwellings.

It is another object of the invention to provide a method and apparatus comprising the placement of fiber glass matting over radon-emitting surfaces, which fiber glass matting will adsorb the radon materials.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features a new method for providing remediation and testing for radon that infiltrates buildings. Experiments by the inventors have determined unexpectedly that glass fibers retard radon passage. The experiments have used optical fibers, each fiber being in an approximate range of 25 to 75 microns in diameter, and according to preliminary experiments, preferably about 50 microns in diameter. The glass fiber comprised a silicon oxide glass that had been doped with trivalent cerium ions to permit real-time monitoring of radon by scintillation.

The bundle of fibers used in the experiments typically contained several thousand individual fibers packed together in a linear arrangement. The overall dimensions of the fiber bundle, in one set of experiments, was a rectangular array measuring 69×12.2×2.4 mm. In a second set of experiments, a cylindrical array 4.8 mm. in diameter by about 8 cm. long, was utilized. In both experiments, air containing radon could pass through the spaces between the fibers.

The cerium dopant caused the glass to scintillate, when exposed to the radiation of the radon materials. The scintillation is measurable, and was detected quantitatively by a photomultiplier tube and associated electronics. The observed scintillation rate can be correlated to the radon level.

Figure 1:
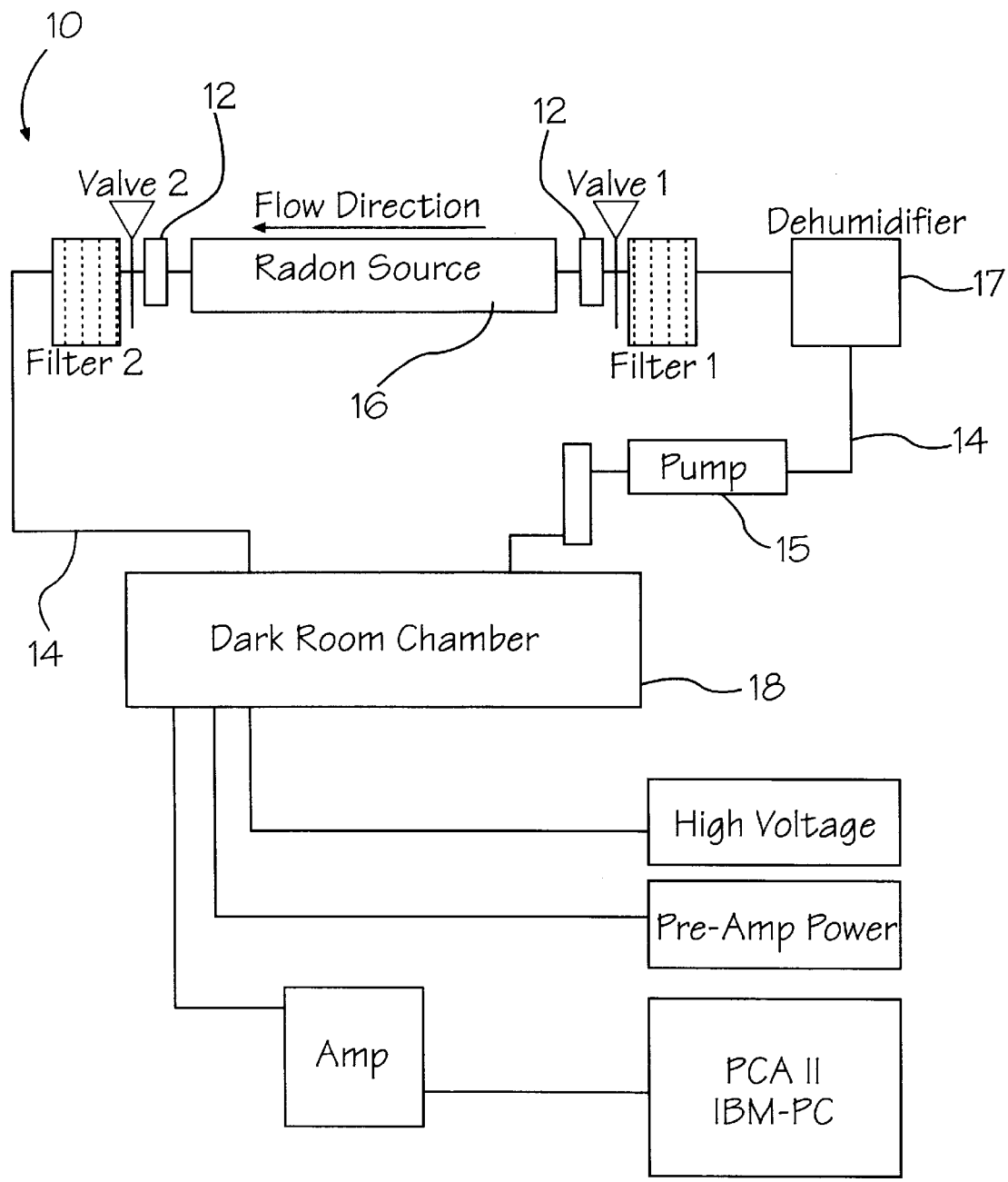
FIG. 1 illustrates a schematic view of a closed-loop circulation system for testing the absorption of radon in glass fiber bundles in accordance with the present invention.

Now referring to FIG. 1, an experimental system 10 is shown for detecting radon. A fiber bundle 12 is disposed within a closed loop 14 on either side of a source of radon 16, before valve 1 and after valve 2. The radon source 16 is a commercial device, Pylon, Inc. Model No. RN-1025, containing 21.5 KBq of $^{226}$radium.

Radium decays into radon. Under conditions of "secular equilibrium" a constant level of radon gas becomes established in the system 10 ($1.024\times10^{10}$ atoms of Rn). This is achieved about 30 days after the radium source has been sealed. The loop 14 contains dry air at atmospheric pressure and temperature. A dehumidifier 17 is used to dry the air. At the start of the experiment the radon source 16, at secular equilibrium, was opened and the contents (air at atmospheric pressure and temperature and containing radon gas) was actively pumped through the fiber bundles 12, using a Manostat Ministaltic pump 15. Scintillations in the bundle 12 were recorded as a function of time in the dark room chamber 18. Filters 1 and 2, using Whatman glass fiber filters, were used to remove the radon progeny from the flow.

Figure 2:
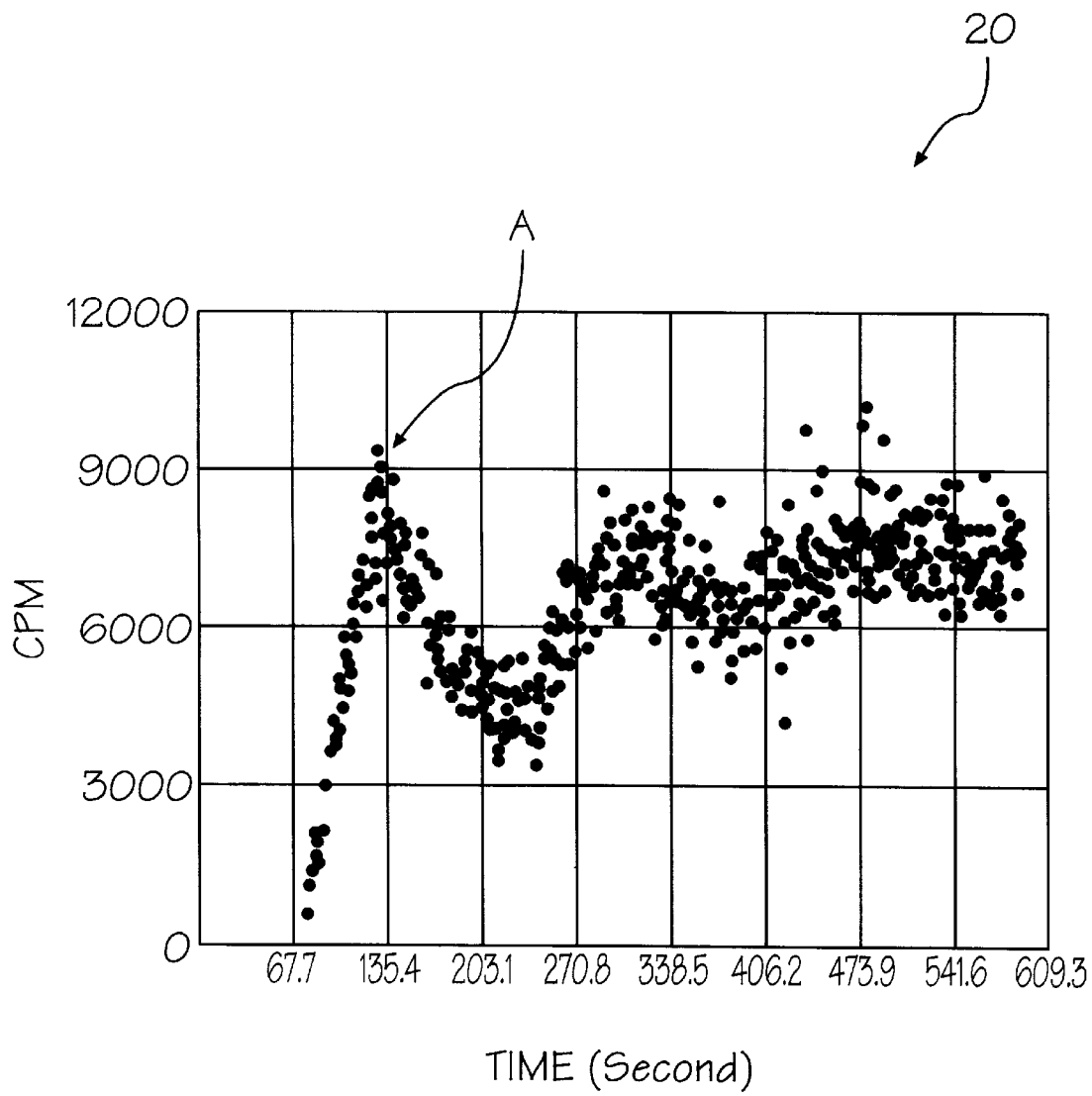
FIG. 2 depicts a graph of the results obtained using the system shown in FIG. 1.

Referring to FIG. 2, a graph 20 is shown of the measured results of the experiment shown for the system 10 of FIG. 1. The first peak "A" of graph 20 is attributed to the first interaction of the radon/air bolus with the bundle 12, and its passage through the bundle 12. Subsequent peaks and observed damping effect are attributed to the bolus of radon passing through the bundle 12 again, and smearing out by diffusive mixing.

Analysis of this data showed the mean residence time of radon in the glass fiber bundle 12 to be 113.2 seconds, a factor of 943 times longer than the 0.12 seconds calculated from the measured bulk air flow rate.

Figure 3:
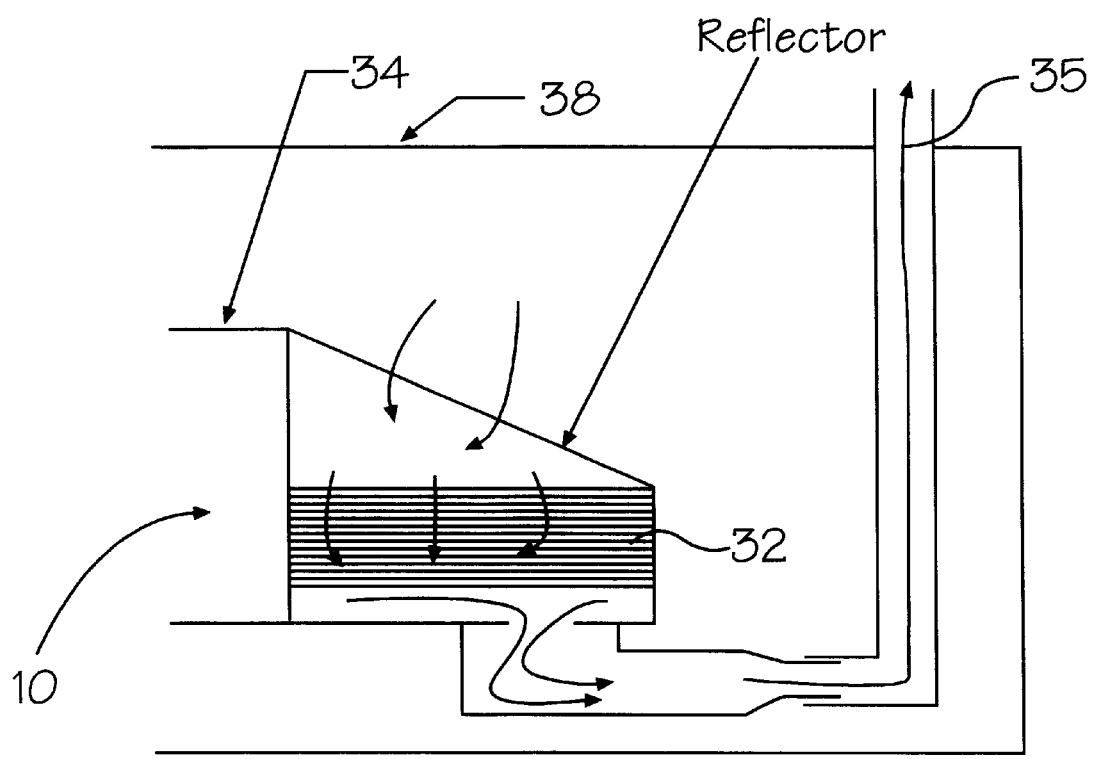
FIG. 3 shows a schematic view of another embodiment of the system depicted in FIG. 1.

Referring to FIG. 3, the experimental system 10 of (FIG. 1), was modified. Radon was first pumped around a closed loop, including the fiber bundle 32. Radon was measured by a photomultiplier (PM) detector 34 disposed within the dark room chamber 38, at steady state. The loop was opened, with continued pumping of the radon through the sensor 34 and thence out to the air (arrow 35). A second, lower, steady state response was recorded. A kinetic analysis of this experiment showed that the major portion of the radon was attached to surfaces within the loop.

Figure 4:
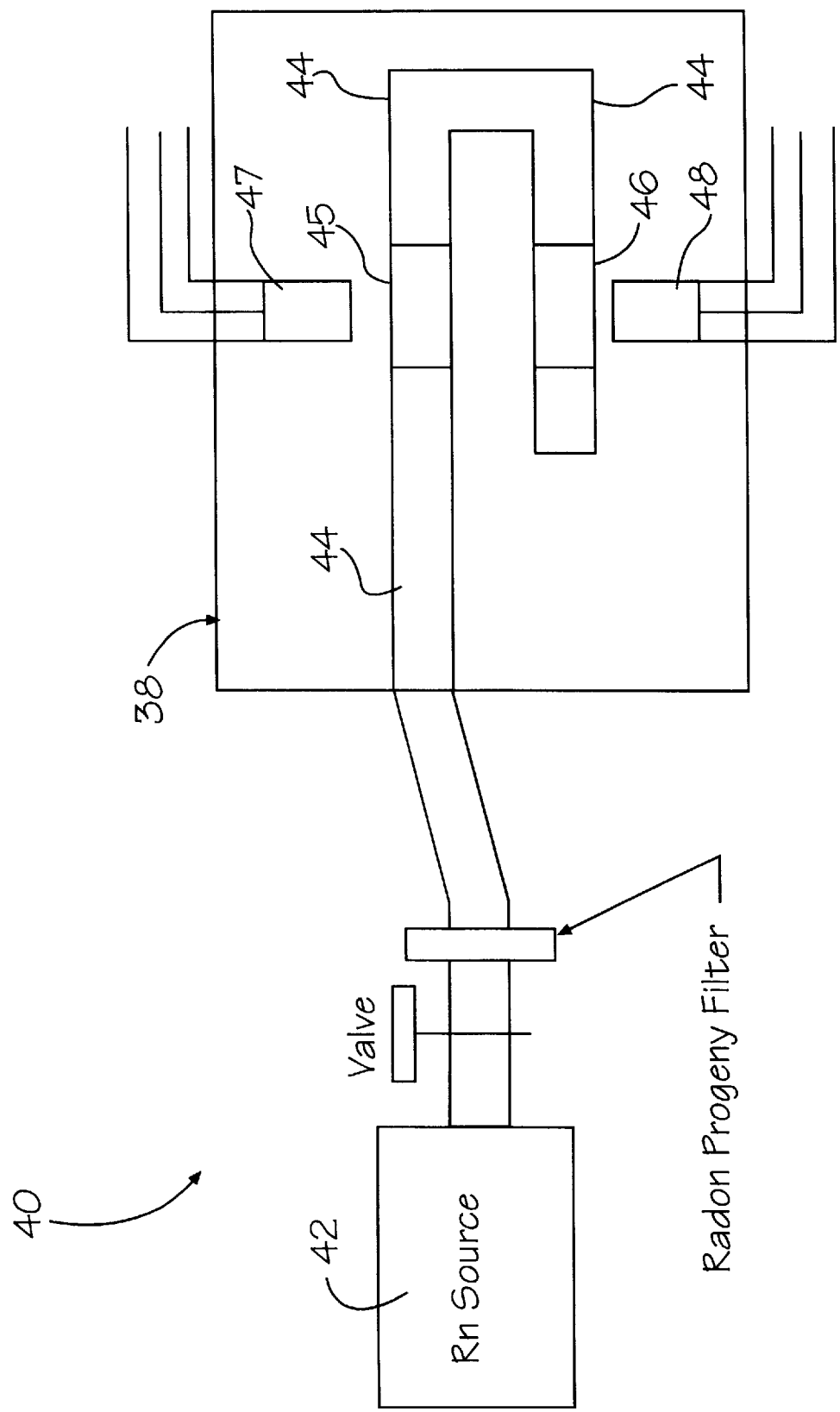
FIG. 4 illustrates a schematic view of a third embodiment of the system shown in FIG. 1.

Referring to FIG. 4, another detection system 40 is shown. In this experimental system 40, radon from a radium source 42 initially at secular equilibrium was admitted to a closed-end, air-filled tube 44. Two fiber bundles 45 and 46 were disposed in series within the closed tube 44, respectively. The passive diffusion of the radon into this tube 44 was followed for over ninety days. The response was monitored by respective photomultiplier (PM) tubes 47 and 48 throughout this period.

After about 10 days, steady state levels of radon activity were established in the two detector bundles 45 and 46, respectively. The higher level was detected at the detector closest to the radon source. During the subsequent eighty days, fluctuations in the response of both detectors correlated closely with room temperature fluctuations. This observation was interpreted as being due to adsorption and desorption of radon from bundle 45 and 46 surfaces in response to temperature changes.

At about ninety days, the detectors were isolated from the radon source and both bundles 45 and 46 showed decreases in response, as the radon decayed, pursuant to its 3.8 day half life. However, the reduction in response was not the same for both bundles. The upstream bundle 45 fell at a faster rate. This result was interpreted as being due to the slowly releasing adsorbed radon atoms into the connecting tubing 44. The radon was held up considerably, as compared to air, in its passage through a glass fiber bundle 45.

The special scintillation properties of the glass fibers used in these experiments are not relevant in their ability to retard radon. It is thus expected that other types of glass fiber, including those used commercially for insulation, would behave similarly towards radon.

Based on the experimental data, it is proposed to cover radon emitting surfaces, such as basement floors, with fiber glass mats in order to remediate radon infiltration in dwellings and buildings. These mats can be replaced like air furnace filters as they become saturated.

It is also contemplated by this invention to use the fiber glass mats as measuring units, wherein radon levels can be determined for a particular site.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. Apparatus for remediating radon in buildings, comprising matting disposable over radon-emitting surfaces, said matting comprising a packed geometry containing a plurality of glass fibers for adsorbing radon and entrapping radon progeny.

2. The apparatus in accordance with claim 1, wherein said glass fibers are doped.

3. The apparatus in accordance with claim 1, wherein said glass fibers are doped with trivalent cerium.

4. The apparatus in accordance with claim 1, wherein said glass fibers are disposed in a matting having a thickness of up to 15.8 cm.

5. The apparatus in accordance with claim 1, wherein said glass fibers are disposed in a matting having several thousand fibers substantially linearly disposed therein.

6. The apparatus in accordance with claim 1, wherein said glass fibers are approximately between 25 and 75 microns in diameter.

7. The apparatus in accordance with claim 1, wherein said glass fibers are approximately 50 microns in diameter.

8. The apparatus in accordance with claim 4, wherein said glass fibers are approximately between 25 and 75 microns in diameter.

9. The apparatus in accordance with claim 4, wherein said glass fibers are approximately 50 microns in diameter.

10. The apparatus in accordance with claim 5, wherein said glass fibers are approximately between 25 and 75 microns in diameter.

11. The apparatus in accordance with claim 5, wherein said glass fibers are approximately 50 microns in diameter.

12. Apparatus for remediating radon in buildings, comprising matting disposable over radon-emitting surfaces, said matting comprising a packed geometry containing a plurality of glass fibers for adsorbing radon and entrapping radon progeny for remediating radon infiltration in a building.

13. The apparatus in accordance with claim 12, wherein said glass fibers are doped with trivalent cerium.

14. The apparatus in accordance with claim 12, wherein said glass fibers are disposed in a matting having a thickness of up to approximately 15.8 cm.

15. The apparatus in accordance with claim 12, wherein said glass fibers are disposed in a matting having several thousand fibers substantially linearly disposed therein.

16. The apparatus in accordance with claim 12, wherein said glass fibers are each approximately between 25 and 75 microns in diameter.

17. The apparatus in accordance with claim 12, wherein said glass fibers are approximately 50 microns in diameter.

18. The apparatus in accordance with claim 14, wherein said glass fibers are approximately between 25 and 75 microns in diameter.

19. The apparatus in accordance with claim 14, wherein said glass fibers are approximately 50 microns in diameter.

20. The apparatus in accordance with claim 15, wherein said glass fibers are approximately between 25 and 75 microns in diameter.

21. The apparatus in accordance with claim 15, wherein said glass fibers are approximately 50 microns in diameter.

* * * * *